United States Patent [19]

Scott

[11] Patent Number: 5,154,373
[45] Date of Patent: Oct. 13, 1992

[54] INTEGRAL STRUCTURE AND THERMAL PROTECTION SYSTEM

[75] Inventor: Harry A. Scott, Hawthorne, Calif.

[73] Assignee: Rockwell International Corporation, Seal Beach, Calif.

[21] Appl. No.: 248,687

[22] Filed: Sep. 26, 1988

[51] Int. Cl.$^5$ .............................................. B64C 1/00
[52] U.S. Cl. ............................ 244/117 R; 244/117 A
[58] Field of Search ............... 244/117 R, 117 A, 133; 428/593, 594, 49, 218, 325, 332, 116

[56] References Cited

U.S. PATENT DOCUMENTS

| | | | |
|---|---|---|---|
| 3,189,477 | 6/1965 | Shaffer | 244/117 A |
| 3,395,035 | 7/1968 | Strauss | 244/117 A |
| 3,920,339 | 11/1975 | Fletcher et al. | 244/117 A |
| 3,930,085 | 12/1975 | Pasiuk | 428/116 |
| 4,578,527 | 3/1986 | Rancourt et al. | 244/158 A |

Primary Examiner—Joseph F. Peters, Jr.
Assistant Examiner—Anne E. Bidwell
Attorney, Agent, or Firm—Charles T. Silberberg; Max Geldin

[57] ABSTRACT

An integral structure and thermal protection system, particularly designed for hypersonic aerospace vehicles, is comprised of a hard external shell or outer face sheet formed of a ceramic matrix, such as silicon carbide, and a rigid insulator core in the form of foamed ceramic, such as silicon carbide, the outer face sheet being integrally connected to the insulator core. A prime strucutral material, such as an aircraft structural member, is integrally connected as by bonding or brazing to the insulator core, the core being attached to the prime structural material or aircraft structural member by an inner face sheet forming the outer skin of such structural member.

20 Claims, 1 Drawing Sheet

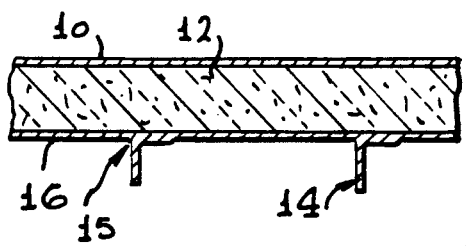
FIG. 1
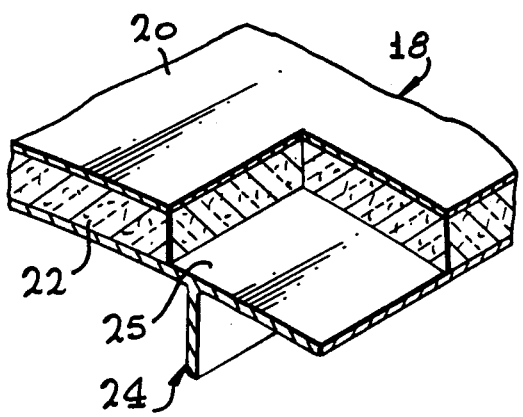
FIG. 2
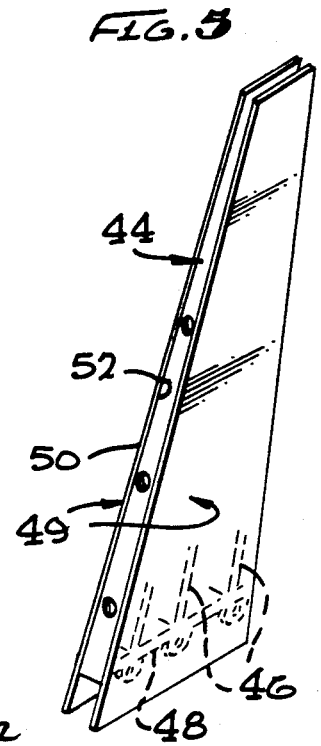
FIG. 6a
FIG. 6
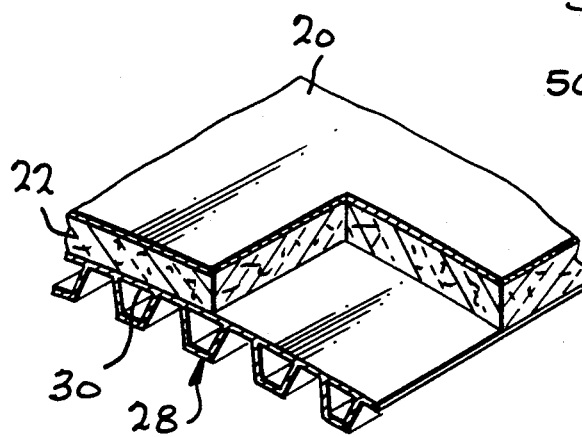
FIG. 3
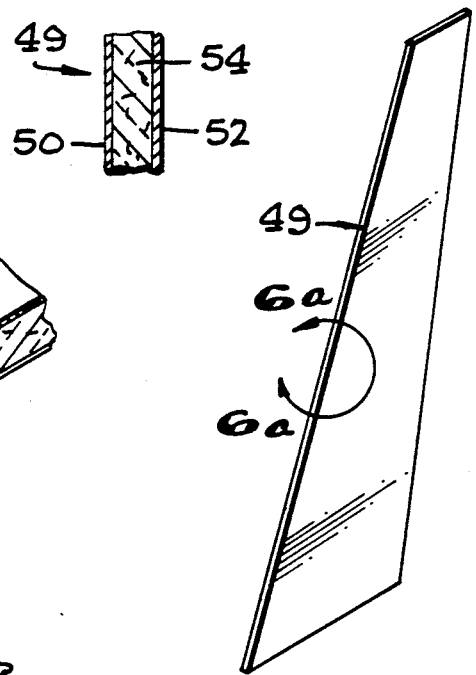
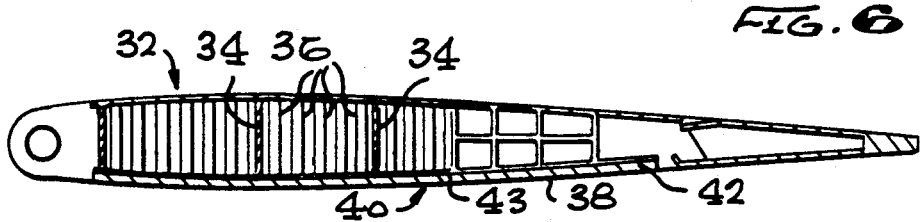
FIG. 4

INTEGRAL STRUCTURE AND THERMAL PROTECTION SYSTEM

BACKGROUND OF THE INVENTION

This invention relates to a system for providing thermal resistance or protection for hypersonic aerospace vehicles and is particularly directed to the production of a combined integral structure and thermal protection system (IS/TPS) for such vehicles.

In the design of thermal protection systems for aerospace vehicles, such system should not transfer excessive heat to the basic vehicle structure, should have low weight, and should produce low thermal stresses. Current thermal protection system concepts employ multitudes of ceramic tiles as reusable surface insulation to accommodate thermal expansion differences with the structure and multitudes of joints resulting in considerable undesirable weight. Such tiles have the further disadvantages of being weak, brittle, and subject to surface cracking, and being labor intensive, both for production and for maintenance.

Various thermal protection systems have been developed in the prior art to overcome these problems. Thus, U.S. Pat. No. 4,344,591 is directed to a multiwall thermal protection system to replace the tile system of the prior art. This patent employs a panel concept with a hard external surface. In one embodiment, the multiwall panels are formed of alternate layers of dimpled and flat titanium alloy foil sheets and beaded scarfed edge seals. An additional embodiment employs an intermediate fibrous insulation for the sandwich panel, and a third embodiment employs a silicide-coated columbium waffle as the outer panel skin and fibrous layered intermediate protection. The panels of this patent are attached to load-bearing channels which are a part of the airframe by means of clips that will deflect to compensate thermal loads.

Examples of other thermal insulation and protection systems are disclosed in U.S. Pat. Nos. 3,177,811; 3,793,861; 3,955,034; 4,173,187; 3,236,476; 3,920,339; and 4,112,179.

It is accordingly an object of the present invention to provide an improved novel thermal protection system for hypersonic vehicles.

Another object of the invention is to provide a durable, light-weight and reusable thermal protection and structure system for high-speed aerospace vehicles.

A further object of the invention is the provision of an improved cost-effective thermal protection or insulation system for high-speed aerospace vehicles, which is readily constructed and maintained, and is formed integral with an airframe component, such as the fuselage, wing or vertical tail of the aerospace vehicle.

SUMMARY OF THE INVENTION

The above objects and advantages are achieved according to the invention by the provision of an integral structure and thermal protection system (IS/TPS), particularly designed for hypersonic aircraft, consisting essentially of a hard, durable external surface member, a rigid insulator core, the external surface member being integrally connected to the insulator core, and an internal prime load-carrying structure suitably joined or affixed to the insulator core.

According to one embodiment, the external surface member is a silicon carbide material, the rigid insulator core is foamed silicon carbide, and the prime load-carrying structure is composed of a graphite-epoxy composite.

The arrangement functions as a sandwich with the thermal protection system supporting and stabilizing the prime load-carrying structure. The insulator core of the thermal protection system is joined to the load-carrying structure or to a component thereof, by a suitable compatible process, such as bonding, brazing, or chemical vapor deposition.

The hard external surface of the thermal protection system of the invention resists handling and damage from foreign objects. The invention system is durable in that it resists oxidation, even at maximum encountered temperature, and is waterproof. The IS/TPS of the invention is lightweight due to the thin external surface and the use of a low density insulator core which aid the prime structure in carrying loads. The system of the invention is reusable because continued operations of the aerospace vehicle will not degrade or dissipate the thermal protection system.

DESCRIPTION OF THE DRAWINGS

FIG. 1 illustrates a cross-section of an integral structure and thermal protection system according to the invention;

FIG. 2 is a perpective cross-sectional view, partly broken away, of a thermal protection system according to the invention, formed integral with a component of an aerospace fuselage structure;

FIG. 3 is a perspective cross-sectional view, partly broken away, similar to FIG. 2, of a thermal protection system of the invention integrally connected to a different structural component of the fuselage;

FIG. 4 is a cross-section of a wing of an aerospace vehicle embodying the thermal protection system of the invention;

FIG. 5 is an elevational perspective view of the vertical tail structure of an aerospace vehicle, incorporating the thermal protection system of the invention;

FIG. 6 is an elevational perspective view of one of the outer thermal insulation panels of the tail structure of FIG. 5; and FIG. 6a is an enlarged partial section of the thermal protection panel of FIG. 6, taken on the circular arrow 6a—6a of FIG. 6.

DETAILED DESCRIPTION OF THE INVENTION AND PREFERRED EMBODIMENTS

Referring to FIG. 1 of the drawing, illustrating an integral structure and thermal protection system according to the invention, the arrangement is comprised of an external face sheet or outer shell 10 forming a hard durable external surface, a rigid insulator core 12 to which the outer face sheet 10 is integrally connected, and a prime load carrying or structure member 15 suitably joined or affixed to the insulator core 12, such as by bonding. Structure member 15 has an inner face sheet 16 which is integral or joined with another component 14 of the structure member 15.

The outer face sheet or outer shell 10 is a ceramic matrix comprised basically of a high temperature ceramic. The preferred ceramic employed is silicon carbide.

An example of such ceramic matrix is in the form of Nextel fiber reinforced silicon carbide. Nextel fabric is an alumina/silica/boria fabric. Chemical vapor deposition can be employed to deposit additional silicon carbide throughout the fibers, if desired.

The outer face sheet or shell 10 can also be in the form of a coating deposited on a heat treated fabric, such as Nextel. Thus, a silicon carbide relatively smooth outer coating can be deposited on such fabric by vapor deposition of silicon carbide which becomes an integral part of the face sheet.

The thickness of the outer face sheet 10, when formed essentially of a ceramic matrix, can be of the order of 0.01", and the thickness of a vapor deposited silicon carbide coating when used to form the outer face sheet 10 can be of the order of about 0.001". The outer face sheet 10 can range in thickness generally from about 0.01" to about 0.06". It is preferred to make the outer face sheet 10 as thin as possible, consistent with aerodynamic, thermal and structural loads, and ease and safety of handling.

The rigid insulator core 12 is formed of a foamed ceramic. Specific ceramic materials which can be employed are silicon carbide or silicon nitride.

The insulator core 12 is made directly upon the outer face sheet 10. In general, the insulator core 12, e.g., in the form of foamed silicon carbide, is deposited on the face sheet 10 by chemical vapor deposition of silicon carbide on the face sheet. Thus, the insulator core 12 is integrally affixed to the outer face sheet 10.

The foam core 12 is porous. In this respect, it is desirable to have as light weight a core as possible for most applications. The density of the ceramic core 12 can range from about 0.5 to about 10 lbs. per cubic ft., preferably about 0.5 to about 1.5 lbs per cubic ft. When deposited by chemical vapor deposition, as noted above, the cermic insulator core 12 has a foam-like appearance.

The thickness of the core 12 is a function of the amount of insulation desired, the length of time it is expected that the aerospace vehicle will be at a high temperture, and the nature of the temperature differential which is desired between the outside and the inside of the vehicle. Thus, the ceramic foam material selected, the density of the foam and its thickness are the criteria which determine what the difference in temperature will be between the outside and the inside of the vehicle by the end of its mission. Generally, thickness of the insulator core 12 can range from about 0.5" to about 6".

The prime structural material, indicated generally at 15, can be composed of materials including composites, metals and metal matrix containing fiber reinforcement. The material selection for the prime structure, such as an airframe component, is dependent on external temperature and internal temperature tolerances, which will vary geographically.

Composites which can be employed as the prime structural material, e.g., of an airframe, can include graphite-epoxy and graphite-polyimide. Instead of graphite fibers, the reinforcing fibers of such composites can comprise boron fibers for high modulus of elasticity, such as boron-epoxy and boron-polyimide composites.

Metals employed as the prime structural material include aluminum and aluminum alloys, e.g., aluminum lithium, and titanium and titanium alloys, such as titanium aluminide.

Metal matrix materials which can be employed as prime structural material include beryllium, aluminum, and aluminum alloys, e.g., aluminum lithium, titanium and alloys thereof, such as titanium-aluminide, steel, molybdenum alloys, or nickel alloys, such as inconel, such metals and metal alloys containing graphite, silicon carbide, or boron fibers or whiskers.

In general, aluminum and graphite-epoxy prime structural materials are used in areas where there is a lower inside temperature, such as a cabin of an aerospace vehicle, or for protecting equipment, such as avionics. Where, for example, equipment on the inside of the aerospace vehicle can withstand a higher temperature, such as electrical or hydraulic equipment which can withstand temperatures, e.g., of the order of 600° F., the structural material can be comprised of graphite-polyimide. Prime structural materials which can withstand the high temperatures include steel, nickel alloys such as inconel, molybdenum alloys, and titanium. These high temperature materials are employed in the form of metal matrix composites which can be metal sheets containing reinforcing fibers, such as graphite or silicon carbide fibers, and in some instances boron fibers. The type of fibers utilized will depend on the particular application of the structural material on the aerospace vehicle and the maximum internal temperatures allowed in the vehicle. Thus, for example, aluminum lithium alloy and graphite-epoxy prime structural materials will withstand temperatures of the order of about 300° F. Titanium aluminide alloy has a 1200°-1500° F. temperature resistance capability.

If the prime structure is to be subjected to tension loads, it is advantageous to have fiber reinforcements as in composites or in metal matrix materials.

The thermal protection system, embodying the ceramic matrix outer face sheet 10 and the rigid insulator core 12 comprised of foamed ceramic, is joined or integrally coupled to the prime structure 15 via face sheet 16 by suitable means, such as bonding, brazing or chemical vapor deposition, depending particularly on the composition of the prime structure material. Thus, when employing graphite-epoxy composite material or aluminum or its alloys as structural material, an epoxy or polyimide is used to bond the foamed ceramic, e.g., silicon carbide, insulator core 12 to the face sheet 16 of parent structural material 15. When employing titanium aluminide, or steel or inconel matrix materials as prime structural material, such materials are suitably brazed to the ceramic insulator core 12, such as foamed silicon carbide, in order to obtain higher bonding temperatures, since organic bonding of such high temperature materials would not be feasible.

It is noted that face sheets, that is, 10 and 16, are utilized on both sides of the ceramic core 12. Thus, the thermal protection system or unit formed, for example, from the integrated silicon carbide face sheet 10 and silicon carbide foamed core 12 is bonded to the basic structural airframe indicated at 15 which would form, for example, the outer skin of the vehicle. Thus, such outer skin of the vehicle 16 now becomes the inner face sheet of the sandwich composed of members 10, 12 and 16. The structural component material 14 can be attached, for example, by bonding, brazing, or by mechanical fasteners, to the thermal protection system formed of members 10, 12 and 16 via the inner face sheet 16, as noted above, depending on the composition of the particular primary structural component material 14.

Thus, it is the above bonding or brazing operation which provides the inner face sheet 16 affixed to the insulator core 12. This permits the rigid foam core 12 with the outer face sheet 10 thereon to support the thin, e.g., metal, face sheet or panel 16, to keep it from buckling or wrinkling. Such structural support reduces the thickness of the face sheet 16. This structural combination provides the integral structure and thermal protection system of the invention.

FIG. 2 of the drawings illustrates a portion of a forward fuselage structure of an aerospace vehicle comprised of an integral structural and thermal protection system (IS/TPS) 18 according to the invention comprised of a silicon carbide composite outer skin or face sheet 20, bonded to a silicon carbide foam insulator core 22, in turn bonded via an inner face sheet 25 of titanium or titanium aluminide to a structural member or blade 24.

FIG. 3 illustrates an alternative arcuately shaped forward fuselage structure to that shown in FIG. 2, except that the primary structure is a titanium aluminide truss core member 28 having an essentially sinusoidal shape, which is diffusion bonded to a titanium aluminide face sheet 30, which in turn is bonded by high temperature brazing material to the silicon carbide foam core 22. Thus, the primary truss core structural member 28 is integrally connected via face sheet 30 to the foam core 22 and outer face sheet 20 forming the integral structure and thermal protection system.

The invention concept can also be applied to other structural airframe components of an aerospace vehicle including the wing and vertical tail. Thus, for example, graphite-epoxy or graphite-polyimide wing and tail structural members can be rendered thermally stable by the thermal protection system of the invention comprised of silicon carbide outer face sheets with a foamed silicon carbide core integrally bonded by an epoxy or a polyimide to the various graphite-epoxy structural members.

In FIG. 4, for example, is shown a cross-section of a wing 32 having an internal structure comprised generally of graphite-polyimide spars 34 and ribs 36, which is covered over its external surface by a thermal protection system 40 formed of a sandwich composed of an outer silicon carbide face sheet 38 and a foamed silicon carbide core 42, the core 42 being suitably bonded to the spars and ribs through a graphite-polyimide inner face sheet 43 to form an integral structure and thermal protection system.

In FIG. 5 is shown a vertical tail structure 44 formed of graphite-polyimide spars 46 and ribs 48 having a thermal protection system in the form of a pair of outer sandwich panels 49, as shown in FIGS. 6 and 6a. Each panel 49 is comprised of silicon carbide outer and inner face sheets 50 and 52 and a foamed silicon carbide core 54. In this example, the inner face sheet 52 is suitably integrally bonded to the spars and ribs of the internal structure of the tail 44 through a polyimide, according to the invention.

Various modifications of the invention can be made. Thus, for example, the outer face sheet 10 can be formed of ceramic matrix materials other than silicon carbide, such as silicon nitride.

From the foregoing, it is seen that the invention provides a novel simple and durable lightweight thermal protection system for each major airframe component of a high speed aerospace vehicle, such as a transatmospheric vehicle, which forms an integral part of such component.

Since various further modifications of the invention will occur to those skilled in the art, the invention is not to be taken as limited except by the scope of the appended claims.

What is claimed is:

1. A thermal protection system for high speed aircraft comprising:
   an outer sheet formed of a ceramic matrix,
   a rigid insulator core consisting essentially of porous foamed ceramic, said outer sheet integrally connected to said core, and
   an internal support structure on said aircraft, said internal support structure being joined to said core through a thin inner face sheet forming a portion of said internal structure, said inner face sheet being bonded to said core,
   said rigid insulator core supporting said thin inner face sheet.

2. The thermal protection system of claim 1, said outer sheet consisting of silicon carbide.

3. The thermal protection system of claim 1, the thickness of said outer sheet ranging from about 0.01" to about 0.06".

4. The thermal protection system of claim 1, said insulator core comprised of a member selected from the group consisting of silicon carbide and silicon nitride.

5. The thermal protection system of claim 1, the density of said core ranging from about 0.5 to about 10 lbs. per cubic ft.

6. The thermal protection system of claim 1, the thickness of said core ranging from about 0.5" to about 6".

7. The thermal protection system of claim 1, said internal support structure comprised of a member selected from the group consisting of a composite material, a metal and a metal matrix containing fiber reinforcement.

8. The thermal protection system of claim 7, said composite material selected from the group consisting of epoxy and polyimide, reinforced with graphite or boron fibers; said metal selected from the group consisting of aluminum and its alloys and titanium and its alloys; and said metal matrix selected from the group consisting of beryllium, aluminum and titanium, and alloys thereof, steel, molybdenum alloys, and nickel alloys, said metal matrix containing graphite, silicon carbide or boron fibers.

9. The thermal protection system of claim 1, said core being integrally coupled to said inner face sheet by bonding, brazing or chemical deposition.

10. The thermal protection system of claim 9, wherein said internal support structure is a portion of the fuselage, wing or tail structure of the aircraft, and wherein said inner face sheet forms the outer skin of said internal support structure.

11. An aerospace vehicle having an integrated thermal protection shield and airframe structure comprising:
   an outer face sheet formed of a ceramic matrix,
   an inner core consisting essentially of porous foamed ceramic supporting said outer face sheet,
   a vehicle structure member, said core being coupled to said vehicle structure member via a thin inner face sheet between said core and said vehicle structure member, said tin inner face sheet forming a portion of said vehicle structure member, and
   means integrally coupling the foamed ceramic core to said inner face sheet,
   said inner core also supporting said thin inner face sheet.

12. The aerospace vehicle of claim 11, said outer face sheet comprised of silicon carbide, said inner core comprised of a member selected from the group consisting of silicon carbide and silicon nitride, and said vehicle structure member comprised of a member selected from the group consisting of a composite material, a metal and a metal matrix containing fiber reinforcement.

13. The aerospace vehicle of claim 12, the density of said core ranging from about 0.5 to about 1.5 lbs. per cubic ft., and the thickness of said core ranging from about 0.5" to about 6".

14. The aerospace vehicle of claim 13, the thickness of said outer face sheet ranging from about 0.01" to about 0.06".

15. The aerospace vehicle of claim 11, said vehicle structure member being associated with the fuselage, wing or tail of the vehicle.

16. The aerospace vehicle of claim 11, said vehicle structure member being a truss core member.

17. The aerospace vehicle of claim 11, said coupling means being formed by bonding or brazing said vehicle structure member to said inner core.

18. The aerospace vehicle of claim 11, said outer face sheet consisting of silicon carbide, said inner core comprised of foamed silicon carbide, and said vehicle structure member comprised of a graphite-epoxy composite.

19. A thermal protection system for high speed aircraft comprising:

an outer sheet formed of a ceramic matrix, a rigid insulator core consisting essentially of porous foamed ceramic, said outer sheet integrally connected to said core, and an internal support structure on said aircraft, said internal support structure being joined to said core through a thin metal inner face sheet forming a portion of said internal structure, said inner face sheet being bonded to said core, said rigid insulator core supporting said thin metal inner face sheet.

20. An aerospace vehicle having an integrated thermal protection shield and airframe structure comprising:

an outer face sheet formed of a ceramic matrix, an inner core consisting essentially of porous foamed ceramic supporting said outer face sheet, a vehicle structure member, said core being coupled to said vehicle structure member via a thin metal inner face sheet between said core and said vehicle structure member, said thin metal inner face sheet forming a portion of said vehicle structure member, and means integrally coupling the foamed ceramic core to said inner face sheet, said inner core also supporting said thin metal inner face sheet.

* * * * *